H. E. LEPPERT.
UNIVERSAL JOINT.
APPLICATION FILED OCT. 8, 1919.
1,358,221.
Patented Nov. 9, 1920.
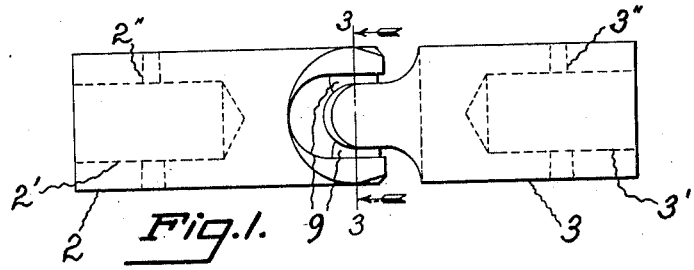
Fig.1.
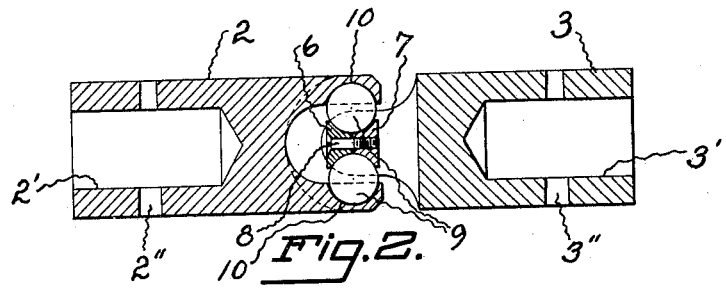
Fig.2.
Fig.3.
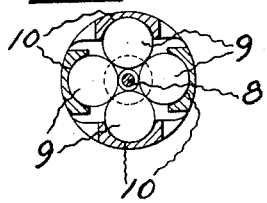
Fig.4.
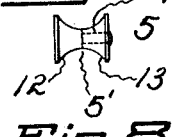
Fig.7.
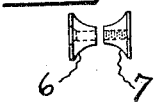
Fig.5.
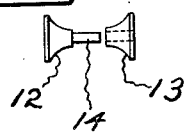
Fig.8.
Fig.6.
Inventor
H. E. Leppert
By
Attorney ated Nov. 9, 1920.
UNITED STATES PATENT OFFICE.

HENRY E. LEPPERT, OF NEW BRITAIN, CONNECTICUT.

UNIVERSAL JOINT.

1,358,221.

Specification of Letters Patent. Patented Nov. 9, 1920.

Application filed October 8, 1919. Serial No. 329,238.

*To all whom it may concern:*

Be it known that I, HENRY E. LEPPERT, a citizen of the United States, residing at New Britain, in the county of Hartford and State of Connecticut, have invented certain new and useful Improvements in Universal Joints, of which the following is a specification.

This invention relates to universal-joints. I have a number of motives in view, among them being the provision of an article of this character in which friction is reduced to a minimum, this result following notwithstanding the fact that the main members of the joint assume a considerable angle to each other. The device is also highly efficient and is capable of properly effecting the transmission of power from one of these members to the other when in their various positions.

In the drawings accompanying and forming part of the present specification I have shown in detail one of the several advantageous forms of embodiment of the invention which to enable those skilled in the art to practice the same will be set forth fully in the following description. I am not necessarily restricted to this particular showing. I may in fact depart therefrom in several respects within the scope of the invention defined by the claims following said description.

Referring to said drawings:—

Figure 1 is an elevation and Fig. 2 a longitudinal section of a universal joint comprising the invention.

Fig. 3 is a transverse section on the line 3—3 of Fig. 1 looking in the direction of the arrows.

Fig. 4 is a detail view of a coupling member.

Fig. 5 is a practically similar view of the same with the sections slightly separated.

Fig. 6 is a detail view of a pin.

Figs. 7 and 8 are views corresponding to Figs. 4 and 5 respectively of a modified form of coupling member.

Like characters refer to like parts throughout the several views.

The device comprises in its make up what might be properly considered as two main members which may be of any suitable nature and one of which is generally the driving member and the other the driven member. These parts may be of any desirable character, for instance, those denoted by 2 and 3 answering my requirements in this regard. As shown each of said main members 2 and 3 is forked, their forks as is common in universal joints being at angles to each other, while as represented the fork of each of the main members has two branches or arms, this may not always be necessary nor is it essential.

In addition to two main members, such as those to which I have referred, there is an auxiliary member or a coupling member so associated with the main members as to permit their relative universal movement. This coupling member like the main members may also vary as to structure. In fact I have illustrated two of the many which are slightly different from each other, one of them appearing in detail in Figs. 4 to 6 and the other in Figs. 7 and 8. While as will be clear I am not restricted in regard to certain features of construction I do prefer the form of coupling member shown in said Figs. 4 to 6 which is that illustrated as incorporated in the joint represented in Figs. 1, 2 and 3. The preferred form of coupling member is designated by 4 and the other by 5, but it may be of decidedly different nature.

Said coupling member 4 is composed as shown, of two practically similar sections 6 and 7, the inner ends of which abut flatwise. These sections taper desirably on curved lines for a reason that will hereinafter appear, from their inner and small ends to their outer or large ends. They may be united in any desirable way. For this purpose a screw as 8 is shown. The sections of the coupling member have central openings extending in the direction of the length of the coupling member, one of said openings or that on the section 6 being plain and the other threaded. The screw 8 fits these openings, the threaded portion of the screw matching the threads on the section 7 and the head of the screw being countersunk in the outer or enlarged end of the section 6. By running the screw in, the two sections of the coupling member can be brought into substantial and solid engagement, at which time there will be presented between its ends an annular groove 4', in which are seated spheres or balls as I will now explain.

I prefer in the construction shown to provide four of these balls each as a matter of convenience being denoted by 9. These four balls are made from suitable material as are the other parts of the joint. The arms or branches of the forks of the main members 2 and 3 are as illustrated, furnished with spherical seats or concavities as 10 to receive the respective spheres or balls 9. The centers of these balls are intersected by a plane extending transversely of the joint and the same observation naturally applies to the centers of the ball seats 10. The inner portions of the respective spheres or balls also fit the annular groove or channel 4' to which I have referred, in the coupling member 4. The balls provide a very effective means for uniting the coupling member to the main members and also secure the proper transfer of power from one of said main members to the other. The joint is powerful and runs virtually frictionlessly yet power is properly applied as will be evident, from one main member to the other.

The coupling member 5 of Figs. 7 and 8 is but slightly different from that described already. It comprises two sections 12 and 13 which are adapted to abut to provide for a peripheral channel 5' as is the case with the coupling member 4. When the parts of the coupling member 5 are assembled as shown in Fig. 7 they produce in fact an article very much like that shown in the other views. The section 12 as shown has a rigid projecting stud or pin 14 to extend through a coaxial opening in the section 13 and to be headed at its outer end over the outer end of the section 13, to thus hold the two sections assembled.

As I have already made it clear the invention involves certain broad relations and I am merely describing but two of the many different forms in which the structure can be embodied. I also prefer that the radius of the seats 10 of the forks of the main members 2 and 3 be greater than that of the balls themselves and I also prefer that the *radii* of the respective annular grooves or channels 4' and 5' be greater than that of said balls or spheres, by virtue of which the joint will operate properly without possibility of the said spheres or balls binding in their seats whether the same be in the main members or in the coupling member; in other words, these spheres or balls are permitted to freely and easily revolve universally at all times when the joint is in action.

The main members 2 and 3 may be associated with a part in any convenient manner. For instance, they may as illustrated be socketed as at 2' and 3' respectively, to receive the adjacent end portions of a pair of shafts held in place in some convenient way as by pins adapted to extend through the said shaft ends and also through perforations 2" and 3" in said main members.

What I claim is:

1. A universal joint comprising main members having arms, an interposed coupling member having an annular channel, and balls, the arms having seats to receive the balls, and the balls also fitting said annular channel.

2. A universal joint comprising main members, an interposed coupling member comprising sections fitted together and jointly having an annular seat, and balls fitted in the annular seat, the main members having seats to receive the balls.

In testimony whereof I affix my signature in the presence of two witnesses.

HENRY E. LEPPERT.

Witnesses:
 MARGARET T. DENNIS,
 HEATH SUTHERLAND.